US012282116B2

(12) United States Patent
Gerchberg et al.

(10) Patent No.: US 12,282,116 B2
(45) Date of Patent: Apr. 22, 2025

(54) MACHINE VISION METHOD AND SYSTEM

(71) Applicant: Wavefront Analysis, Inc., New York, NY (US)

(72) Inventors: Rolf Jon Gerchberg, Longmeadow, MA (US); Thomas Dean Milster, Tucson, AZ (US)

(73) Assignee: Wavefront Analysis, Inc., New York, NY (US)

( * ) Notice: Subject to any disclaimer, the term of this patent is extended or adjusted under 35 U.S.C. 154(b) by 1459 days.

(21) Appl. No.: 16/376,804

(22) Filed: Apr. 5, 2019

(65) Prior Publication Data

US 2019/0310374 A1 Oct. 10, 2019

Related U.S. Application Data

(60) Provisional application No. 62/652,939, filed on Apr. 5, 2018.

(51) Int. Cl.
| | |
|---|---|
| *G01S 17/89* | (2020.01) |
| *G01S 7/481* | (2006.01) |
| *G01S 7/484* | (2006.01) |
| *G01S 7/486* | (2020.01) |
| *G01S 7/51* | (2006.01) |
| *G01S 17/10* | (2020.01) |
| *G02B 5/32* | (2006.01) |
| *G03H 1/08* | (2006.01) |

(52) U.S. Cl.
CPC ............ *G01S 7/4815* (2013.01); *G01S 17/89* (2013.01); *G02B 5/32* (2013.01); *G03H 1/0866* (2013.01)

(58) Field of Classification Search
CPC .......... G01S 7/4815; G01S 17/89; G01S 7/51; G01S 17/931; G02B 5/32; G02B 27/4233; G03H 1/0866
USPC .......................................................... 359/9
See application file for complete search history.

(56) References Cited

U.S. PATENT DOCUMENTS

| | | | | |
|---|---|---|---|---|
| 9,217,635 | B2* | 12/2015 | Guetta | G01S 17/89 |
| 9,841,496 | B2* | 12/2017 | Hudman | G01S 17/08 |
| 11,099,523 | B1* | 8/2021 | Gatt | G01S 17/89 |
| 2006/0055937 | A1* | 3/2006 | Lal | G01H 9/00 |
| | | | | 356/486 |

(Continued)

*Primary Examiner* — Stephone B Allen
(74) *Attorney, Agent, or Firm* — BOND, SCHOENECK & KING, PLLC; George R. McGuire

(57) ABSTRACT

An optical system for automated vision and detection. The system includes a light source configured to emit a beam into an environment and a first diffractive optical element. The beam passes through the first diffractive optical element, resulting in a plurality of beams. One or more of the plurality of beams are reflected by the environment, resulting in reflected beams. A second diffractive optical element of the optical system is configured to receive the reflected beams. A detector in alignment with the second diffractive optical element receives the reflected beams. The detector is configured to determine wave data from the reflected beams and generate a plurality of phasorgrams in a single image representing the wave data. The optical system also includes a processor configured to receive the single image and generate a representation of the environment. A control computer is configured to receive the representation of the environment from the processor.

5 Claims, 7 Drawing Sheets

(56) References Cited

U.S. PATENT DOCUMENTS

| | | | | |
|---|---|---|---|---|
| 2010/0177164 A1* | 7/2010 | Zalevsky | ............... | H04N 13/20 |
| | | | | 348/46 |
| 2010/0281986 A1* | 11/2010 | Toal | ......................... | G01H 9/00 |
| | | | | 73/656 |
| 2013/0208256 A1* | 8/2013 | Mamidipudi | ......... | G01S 7/4815 |
| | | | | 359/15 |
| 2017/0004623 A1* | 1/2017 | Zalevsky | .......... | H01L 29/42328 |
| 2019/0179016 A1* | 6/2019 | Raring | .................. | H01S 5/0085 |
| 2021/0341620 A1* | 11/2021 | Raz | ....................... | G01S 17/894 |

* cited by examiner

MACHINE VISION METHOD AND SYSTEM

CROSS-REFERENCE TO RELATED APPLICATIONS

This application claims priority to U.S. Provisional Patent Application Ser. No. 62/652,939, filed on Apr. 5, 2018 and entitled "Machine Vision Method and System," the entirety of which is incorporated herein by reference.

BACKGROUND OF THE INVENTION

1. Field of the Invention

The present disclosure is directed generally to system and methods for automated vision and detection and, more particularly, to an optical system for deriving phase information of an environment.

2. Description of Related Art

Machine vision is a name given to the systems and methods used to provide automatic imaging-based detection and analysis. These methods and systems can be utilized for a wide variety of applications, including but not limited to guidance systems, inspection systems, processing systems, sensor systems, and many others.

Machine vision systems can be implemented with a wide variety of technologies and methodologies. A system may include, for example, an imaging device configured to obtain imaging information about the environment within which is it designed to operate. The imaging device may be a traditional two-dimensional light camera, and/or it may be a multispectral imager, hyperspectral imager, infrared imager, X-ray imager, and/or other imagers. The system may also include a processor or other processing device configured to receive, store, and/or analyze the images obtained by the imaging device, which produces an output that may be utilized in one or more downstream applications.

Just one example of a machine vision system is an automated imaging system for a moving vehicle such as a car, truck, and other type of vehicle, which can be utilized to supplement a driver's control of a vehicle, or to supplant the driver's control in the case of autonomous or semi-autonomous vehicles.

One common machine vision system utilized in moving vehicles is LIDAR, an imaging method that illuminates an environment with potential targets/objects with pulsed laser light, and measures distances to potential targets/objects based on reflected pulses as detected by a sensor. A three-dimensional representation of the environment can then be digitally created using the measured distances.

However, LIDAR and similar systems suffer from many deficiencies that constrain their ability to operate as efficient and highly-effective imagers for machine vision systems. Among other limitations, LIDAR systems are expensive and suffer from low resolution, and thus are typically unable to create the high-resolution three-dimensional maps of the environment necessary for imaging devices operating in high speed situations, and/or necessary for imaging devices operating in environments requiring high-resolution three-dimensional maps.

Accordingly, there is a continued need for affordable and efficient optical systems capable of creating high-resolution three-dimensional maps of an environment.

SUMMARY OF THE INVENTION

The present disclosure is directed to inventive methods and systems for automated vision and detection. According to an embodiment, the present invention is an optical system. The optical system includes a light source configured to emit a beam into an environment and a first diffractive optical element. The beam passes through the first diffractive optical element, resulting in a plurality of beams. One or more of the plurality of beams are reflected by the environment, resulting in reflected beams. A second diffractive optical element of the optical system is configured to receive the reflected beams. A detector in alignment with the second diffractive optical element receives the reflected beams. The detector is configured to determine wave data from the reflected beams and generate a plurality of phasorgrams in a single image representing the wave data. The optical system also includes a processor configured to receive the single image and generate a representation of the environment. A control computer is configured to receive the representation of the environment from the processor.

According to another embodiment, the present invention is a system for automated vision and detection. The system includes an imager configured to obtain a plurality of phasorgrams of an environment and each of the phasorgrams comprises phase information. The imager is configured to generate a single image using the phase information. The system also includes a processor configured to derive a representation of the environment based on the single image and an implementation module configured to receive the representation of the environment and generate a response based thereon.

According to yet another embodiment, the present invention is an optical system for generating digital images. The system includes a light source configured to emit a beam into an environment and a first diffractive optical element. The beam passes through the first diffractive optical element, resulting in an illumination wave. The illumination wave is emitted into the environment and is reflected by the environment, resulting in a reflected illumination wave. A second diffractive optical element of the optical system is configured to receive the reflected illumination wave. A detector in alignment with the second diffractive optical element receives the reflected illumination wave. The detector is configured to determine wave data from the reflected illumination wave and generate an image representing the wave data. The optical system also includes a processor configured to receive the image and generate a representation of the environment.

According to an embodiment, the methods described or envisioned in U.S. Pat. No. 8,040,595 are directed to a method and/or system for reconstructing a wave, including interpolation and extrapolation of the phase and amplitude distributions. For example, according to one aspect is a method for reconstructing a wave. The method includes the steps of: (i) illuminating a specimen at an output plane to provide an output wave comprising specimen information, the output plane including a null region in which the output wave has a value of zero; (ii) applying a number N of different phase filters of known phase shift to the output wave at or near the output plane to create N phase-shifted waves each having a phase shift that corresponds to a respective phase filter; (iii) measuring at a diffraction plane only a portion of the amplitude distribution for each of N diffraction patterns to provide measured and unmeasured portions of the amplitude distributions of the diffraction patterns, each diffraction pattern corresponding to a respective one of the phase-shifted waves; (iv) inverse Fourier-transforming each of the measured portions of the amplitude distributions of the diffraction patterns to produce a respective computed estimate of the phase-shifted wave at the output plane, the computed estimates comprising both amplitude and phase information; (v) applying a respective inverse phase filter to each of the computed estimates of the phase-shifted waves to remove the phase-shift introduced by the corresponding phase filter to provide computed estimates of non-phase-shifted waves at the output plane; (vi) correcting the computed estimates of the non-phase-shifted waves by setting the values of the amplitude and phase to zero for those portions of the computed estimates of the non-phase-shifted waves which correspond to the null region of the output plane to provide a plurality of corrected estimates; and (vii) recovering the amplitude and phase in the diffraction plane of the unmeasured portion of the amplitude distributions of the diffraction patterns based on the corrected estimates, whereby the amplitude and phase information of the unmeasured portion is recovered to achieve super-resolution.

According to another aspect is a method for reconstructing a wave. The method includes the steps of: (i) illuminating a specimen at an output plane to provide an output wave comprising specimen information, the output plane including a null region in which the output wave has a value of zero; (ii) applying a number N of different filters to the output wave at or near the output plane to create N filtered waves each corresponding to a respective filter; (iii) measuring at a diffraction plane only a portion of the amplitude distribution for each of N diffraction patterns to provide measured portions of the amplitude distributions of the diffraction patterns, each diffraction pattern corresponding to a respective one of the filtered waves; (iv) inverse Fourier-transforming each of the measured portions of the amplitude distributions of the diffraction patterns to produce a respective computed estimate of the filtered wave at the output plane, the computed estimates comprising both amplitude and phase information; (v) applying a respective inverse filter to each of the computed estimates of the filtered waves to provide computed estimates of non-filtered waves at the output plane; (vi) correcting the computed estimates of the non-filtered waves by setting the values of the amplitude and phase to zero for those portions of the computed estimates of the non-filtered waves which correspond to the null region of the output plane to provide a plurality of corrected estimates; and (vii) recovering the amplitude and phase in the diffraction plane of the unmeasured portion of the amplitude distributions of the diffraction patterns based on the corrected estimates, whereby the amplitude and phase information of the unmeasured portion is recovered to achieve super-resolution.

According to an embodiment, the automated vision and detection system can be a component of or integrated into any system or device requiring automated vision or detection. The automated vision and detection system can be a component of or otherwise integrated into a guidance system, inspection system, processing system, sensor system, and/or many other systems. As just one embodiment, the automated vision and detection system can be a component of or otherwise integrated into an automated imaging system for a moving vehicle such as a car, truck, and other type of vehicle. As another example, the automated vision and detection system can be a component of or otherwise integrated into a handheld device configured to obtain imaging information from or about the environment.

As another example, the automated vision and detection system can be a component of or integrated into a system configured to be utilized to detect, map, or otherwise characterize air or wind patterns. For example, the automated vision and detection system can be utilized to make a three-dimensional map of air, wind patterns, wind shear, and/or other air structures.

As another example, the automated vision and detection system can be a component of or integrated into a system configured to be utilized to detect, map, or otherwise characterize water or wave patterns. For example, the automated vision and detection system can be utilized to make a three-dimensional map of water, water or wave patterns, water flow, and/or other water structures. Many other types of vision or detection systems are possible.

These and other aspects of the invention will be apparent from the embodiment(s) described hereinafter.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
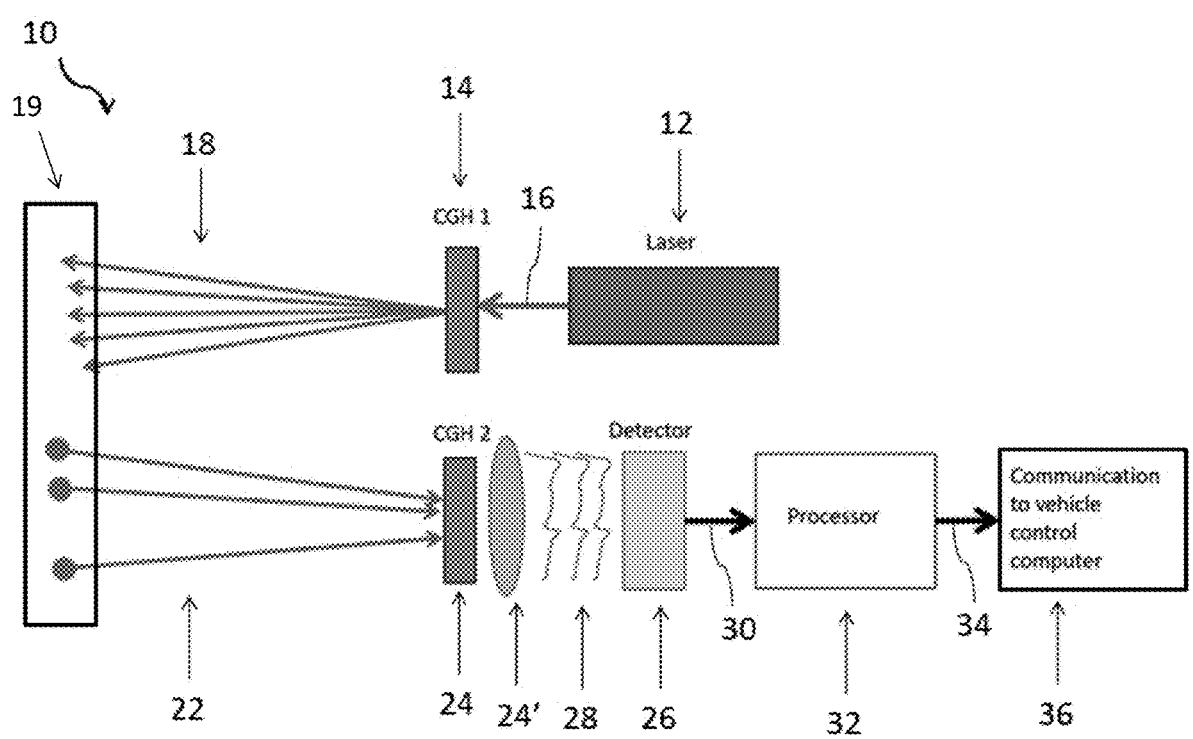
FIG. 1 is a diagrammatic representation of an optical system for automated vision and detection, in accordance with an embodiment.

Referring now to the figures, wherein like reference numerals refer to like parts throughout, FIG. 1 shows a diagrammatic representation of an optical system 10 for automated vision and detection. The optical system 10 in FIG. 1 can be used in uncontrolled environments, such as roadways, and at a distance (e.g., >20 ft.). The optical system 10 comprises a laser 12 positioned in line or at a first diffractive optical element 14. In the depicted embodiment, the first diffractive optical element is a computer-generated hologram (CGH) device. As shown in FIG. 1, the laser 12 emits a beam 16 at the first diffractive optical element 14. The first diffractive optical element 14 is a beam splitter and splits the incoming beam 16 into multiple beams 18 (or a plurality of beams), which exit the first diffractive optical element 14.

Figure 5:
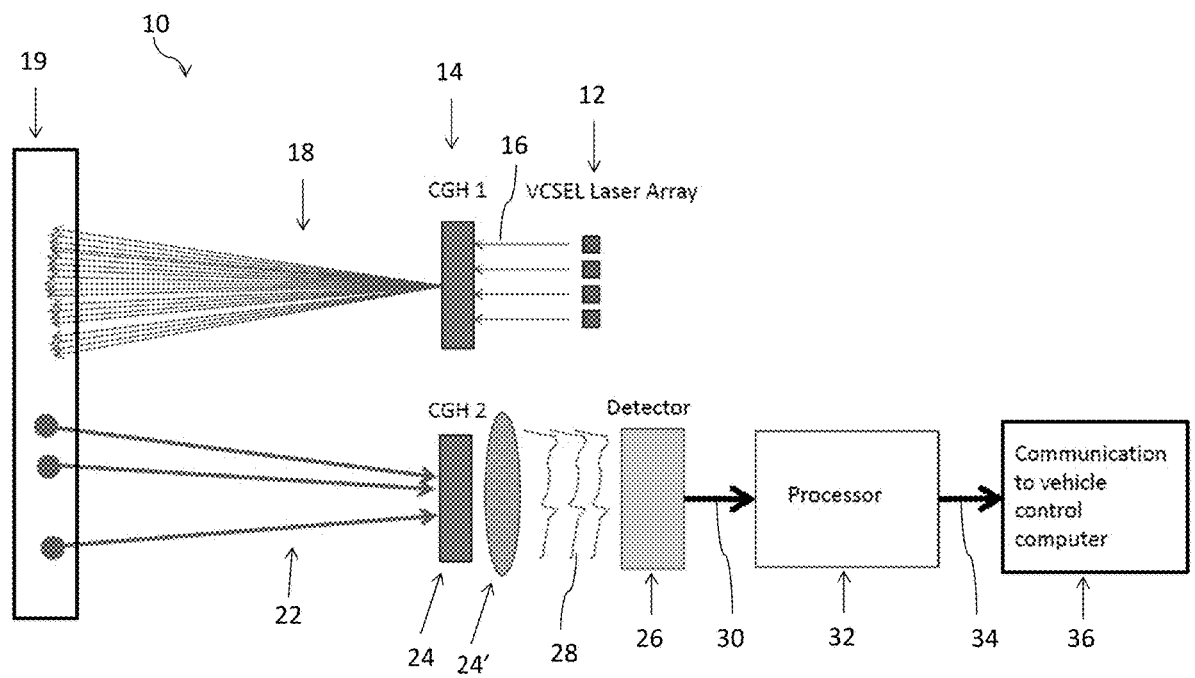
FIG. 5 is a diagrammatic representation of an optical system for automated vision and detection, in accordance with an alternative embodiment.

In an alternative embodiment, shown in FIG. 5, the laser 12 is replaced with a VCSEL laser array as a light source. The VCSEL laser array 12 effectively multiplies the number of beams 18 in the field of view by the number of VCSELs when used with the first diffractive optical element 14. In the depicted embodiment, using a VCSEL laser array 12 quadruples the number of beams 18 in the field of view. However, in theory, the VCSEL laser array 12 can be configured to generate any desired number of beams 18. For example, if a VCSEL "chip" (laser array) 12 with 16 beams 18 is used and the first diffractive optical element 14 has a 200-beam fanout, 16*200=3200 beams will be produced at once. Practically, the power of the VCSEL laser array 12 will be limited to a practical fanout number.

Figure 2:
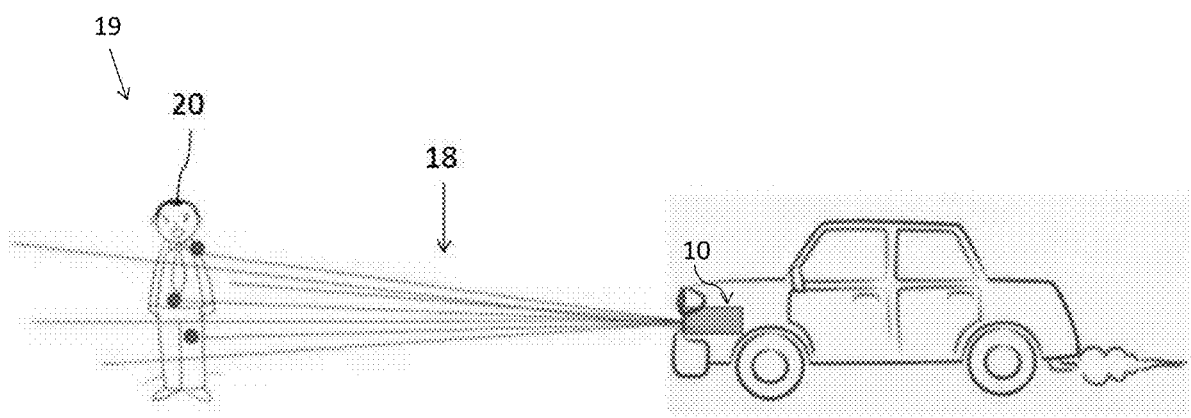
FIG. 2 is a diagrammatic representation of the optical system in use in a vehicle, in accordance with an embodiment.

The multiple beams 18 exit the first diffractive optical element 14 and continue into a surrounding environment 19 until they contact an object 20, such as that shown in FIG. 2. As an example, the environment 19 may be a factory, an assembly line, a warehouse, the outdoors, a road, or any other type of environment. If one or more of the multiple beams 18 contacts the object 20, those beams are reflected back toward the optical system 10 as reflected beams 22. As shown in FIG. 1, the reflected beams 22 pass through a second diffractive optical element 24. The second diffractive optical element 24 may also be a CGH device. In the depicted embodiment, the second diffractive optical element 24 may additionally include a lens (or system of lenses) 24'. Similarly, the first diffractive optical element 14 may also comprise a lens 24' (or system of lenses). Further, one lens can be used for both diffractive optical elements 14, 24 if a beam splitter is used—as understood by a person of ordinary skill in the art).

The second diffractive optical element 24 enables the formation of multiple phasorgrams 28. In the depicted embodiment, a plurality of phasorgrams 28 are produced simultaneously. The second diffractive optical element 24 has filters which allow for the creation of multiple phasograms 28, a phasogram 28 for each point in the environment 19 that is reflected (in the reflected beams 22).

Still referring to FIG. 1, the optical system 10 additionally includes a detector 26, such as a charge-coupled detector (CCD) device (e.g., camera). The detector 26 is aligned with the second diffractive optical element 24 or positioned relative to the second diffractive optical element 24 such that the multiple phasorgrams 28 exiting the second diffractive optical element 24 are received at the detector 26. The phasorgrams 28 (including wave data) are acquired simultaneously at the detector 26 for simultaneous processing, rather than a sequential acquisition, like traditional optical systems/methods, such as LIDAR. The detector 26 obtains and extracts wave information (or "wave data") from the phasorgrams 28, interprets the wave data, and produces a single image 30.

As shown in FIG. 1, the optical system 10 further comprises a processor 32. The processor 32 is connected to the detector 26 via a wired or wireless connection. The processor 32 is capable of performing digital signal-processing functions, such as two-dimensional Fast Fourier Transforms. In an embodiment, the processor 32 is a GPU processor, which permits the parallel processing of simultaneous information, increasing the speed of processing. The single image 30 is transmitted (via a wired or wireless connection) from the detector 26 to the processor 32. The processor 32 performs various steps of data processing using the single image 30 to create a single representation 34 of the environment 19 (FIGS. 1-2), including any objects 20 in the environment 19. The representation 34 of the environment is then transmitted (via a wired or wireless connection) from the processor 32 to a control computer 36. The control computer 36 can be an existing computer in the vehicle, a computer within the optical system 10, or a remote computer. The control computer 36 is programmed with various instructions or "rules" for generating a response to the representation 34.

Figure 3:
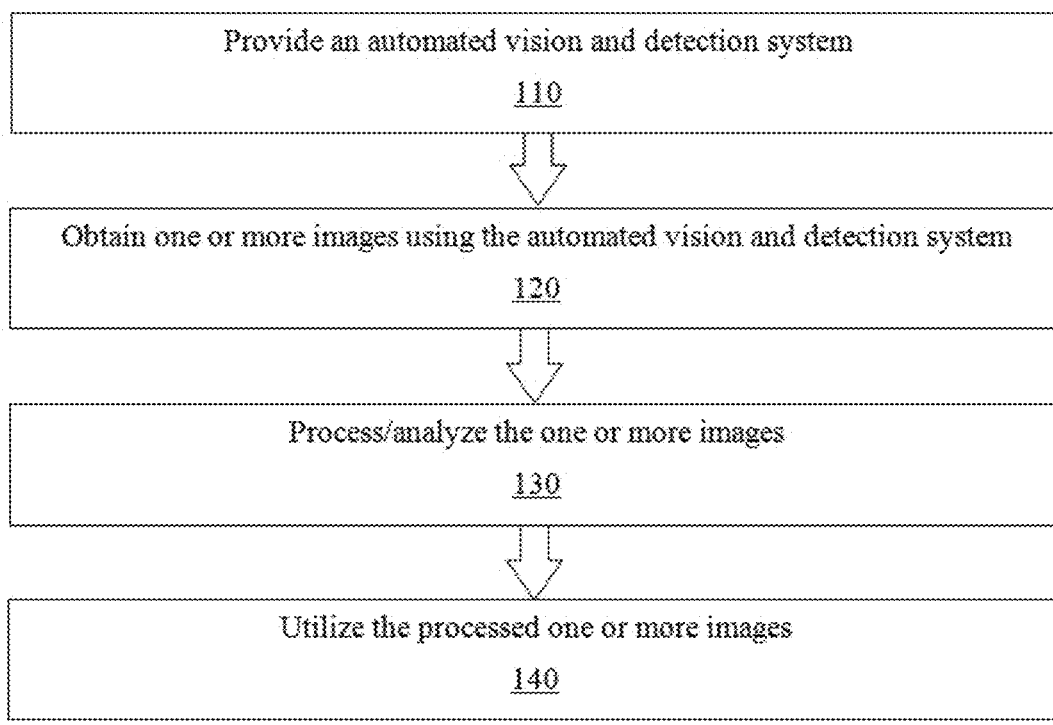
FIG. 3 is a schematic representation of a machine vision method, in accordance with an embodiment.

Turning now to FIG. 3, there is shown a schematic representation of a method 100 for automated vision and detection. At step 110 of the method, the optical system 10, as described above, is provided within a vehicle. As described herein, a vehicle can be any movable device, including an automobile, a plane, a drone, etc. The embodiment of the optical system 10 described herein is installed within an automobile, as shown in FIG. 2, although the optical system 10 can be scaled and applied to other movable devices. In this embodiment, the optical system 10 is installed within an automobile such that the processor 32 of the optical system 10 is connected to the control computer 36 of the automobile.

Figure 4:
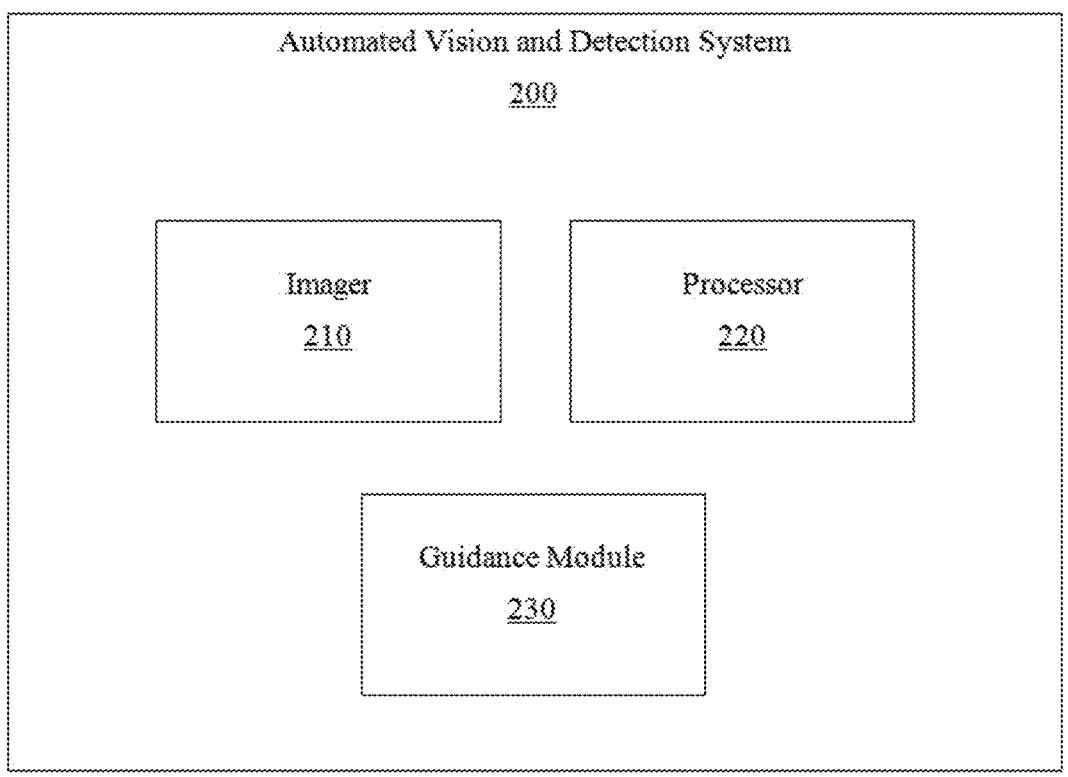
FIG. 4 is a schematic representation of a machine vision system, in accordance with an embodiment.

An exemplary embodiment of the optical system 10 integrated within an automobile is shown in FIG. 4. In FIG. 4, the optical system (also referred to as "the automated vision and detection system") 200 includes an imager 210. The imager 210 comprises the laser 12, the first and second diffractive optical elements 14, 16, and the detector 26 components of the optical system 10 of FIG. 1. The optical system 200 in FIG. 4 also includes a processor 220 (analogous to the processor 32 in FIG. 1). The processor 220 is in communication with the imager 210, and is configured to receive one or more images 30 from the imager 210 for processing. As described or otherwise envisioned herein, the processing by processor 220 can comprise any analysis or processing required to implement the goals or design of the automated vision and detection system 200. In particular, the processor 220 may process the received single image 30 to derive a representation 34 of the imaged environment 19.

The optical system 200 for an automobile in FIG. 4 additionally includes a guidance module 230 (e.g., at the control computer 36 of the automobile (FIG. 1)). The guidance module 230 or any other module or component is configured to receive processed imaging information from processor 220, such as the generated representation 34 (FIG. 1) of the imaged environment 19 (FIG. 1), among other processed imaging information. Accordingly, the module 230 may be any implementation module that uses or implements the processed imaging information from the processor 220. For example, the implementation module 230 may be a guidance module which utilizes the processed imaging information from the processor 220 to guide a vehicle, robot, or other device.

Referring back to FIG. 3, at step 120 of the method, the imager 210 obtains one or more phasorgrams 28 of the environment 19 (FIG. 1) in which the imager 210 or optical system 200 is located. The environment 19 can be any location or area that can be imaged or otherwise assessed utilizing the imager 210, such as the road. The imager 210 obtains one or more images (i.e., phasorgrams 28) of the environment 19. Specifically, the beam splitting properties of the second diffractive optical element 16 of the imager 210 allow for numerous separate phasorgrams 28 to be taken on the same plane simultaneously. Thus, instead of a series of images (or phasorgrams) 28 taken sequentially, as is done in traditional optical systems, the imager 210 described herein takes all the images 28 at the same time.

Simultaneous detection/processing of the images (phasorgrams) 28 is a crucial difference (as compared to traditional optical systems) for allowing the optical system 10 described herein to work in real-time. It also allows the optical system 10 to work in a solid state manner without any moving parts. This is a significant improvement over traditional optical systems because it increases the speed at which the optical system 200 (and optical system 10) processes the environment 19 (FIG. 1). Significantly improving the processing speed of the phasorgrams 28 completely or almost entirely eliminates time distortion. The system 200 may obtain the one or more phasorgrams 28 automatically (such as continuously or pursuant to a timer or other periodic system), and/or may obtain imaging information in response to an internal or external stimulus, and/or may obtain imaging information in response to a command from a user or other command provider. As described with reference to FIG. 1, the imager 210 (via the detector 26), generates a single image 30 from the phasorgrams 28.

At step 130 of the method, the processor 220 processes or otherwise analyzes the single image 30 obtained by the imager 210 and provided to the processor 220. The optical system 200 may provide the single image 30 to the processor 220 immediately, and/or in response to a request for the single image 30 by the processor 220. The single image 30 may also be temporarily or permanently stored before and/or after analysis by the processor 220. For example, the single image 30 may be stored in a database for batch processing, delayed processing, or periodic processing. Processing may also be performed in real-time.

The processor 220 analyzes the single image 30 obtained by the imager 210 using any method of analysis, including but not limited to one or more aspects of the methods set forth in detail in U.S. Pat. No. 8,040,595. Accordingly, the disclosure of U.S. Pat. No. 8,040,595, which was filed as U.S. patent application Ser. No. 12/376,890 on Feb. 9, 2009 (claiming priority to PCT App. No. PCT/US2007/018008 filed on Nov. 2, 2007) and published as U.S. Pat. Pub. No. 2001/0032586 on Feb. 10, 2011, entitled "Light Microscope with Novel Digital Method to Achieve Super-Resolution," is hereby incorporated herein in its entirety. According to one embodiment, the output of processing or analysis by the processor 220 is a two-dimensional or three-dimensional representation 34 of the environment 19 in which the single image 30 was obtained.

The '595 patent mentioned above describes how a scalar wave front may be represented as a two-dimensional complex function by inferring the phase distribution from the measured amplitude distribution of the wave front. Using the paraxial approximation and the restrictions of Fresnel diffraction, the initial wave front at $z=z_i$ which is propagated along the z axis (normal to the wave front) is related to the observed wave front downstream of at $z_i$, at $z=z_o$, by the equation:

$$U(x_0, y_0) = \frac{1}{jz\lambda} \exp(jkz)\exp\left[\frac{(jk)(x_o^2 + y_o^2)}{2z}\right] \\ \int\int U(x_i, y_i)\exp\left[\frac{(jk)(x_i^2 + y_i^2)}{2z}\right] \times \exp\left[\frac{(-j2\pi)(x_0 x_i, y_0 y_i)}{z\lambda}\right] dx_i dy_i \quad (1)$$

where $U(x, y)$ is the total complex wavefunction in the (x, y) plane normal to the z axis, z is the drift distance between the initial wave front and the observed wave front (i.e. $z=z_o-z_i$), $\lambda$ is the wavelength, the subscript i indicates quantities in the initial wave plane, the subscript o indicates quantities in the observed wave plane and k is the free-space wavenumber in radians per wavelength.

An eminently readable derivation of this diffraction equation (1), and the paraxial and Fresnel diffraction constraints is known. Equation (1), assuming full knowledge of a scalar wave front (a two-dimensional complex function of Cartesian coordinates x and y in a plane normal to the z direction of propagation), allows for the calculation of the two-dimensional complex wavefunction at any drift distance downstream. Based on equation (1), given the amplitude distribution of the complex wave front in the observation plane, one can generate the phase function of the wave front and thereby provide the information to reconstruct the actual wavefunction in the initial plane uniquely.

To solve the phase retrieval problem, the algorithmic process is cyclic. The complex function representing each phasorgram in the image plane is estimated and then these estimates are used to generate a single new estimate of the complex wavefunction in the initial plane. This new initial plane complex function is then used to generate better estimates of the image plane phasorgrams and so on. An index of the goodness of these estimates is the squared difference between the estimated and measured amplitude of each pixel summed over all the phasorgrams. Dividing this number by the sum of the squared measured amplitudes of each pixel over all pixels over all phasorgrams (the defined phasorgrams' energy) gives a normalized index called the fractional error. Note that, the smaller the fractional error, the more the phasorgram estimates look like the measured phasorgrams and presumably the better the complex function estimate resembles the sought function.

Figure 7:
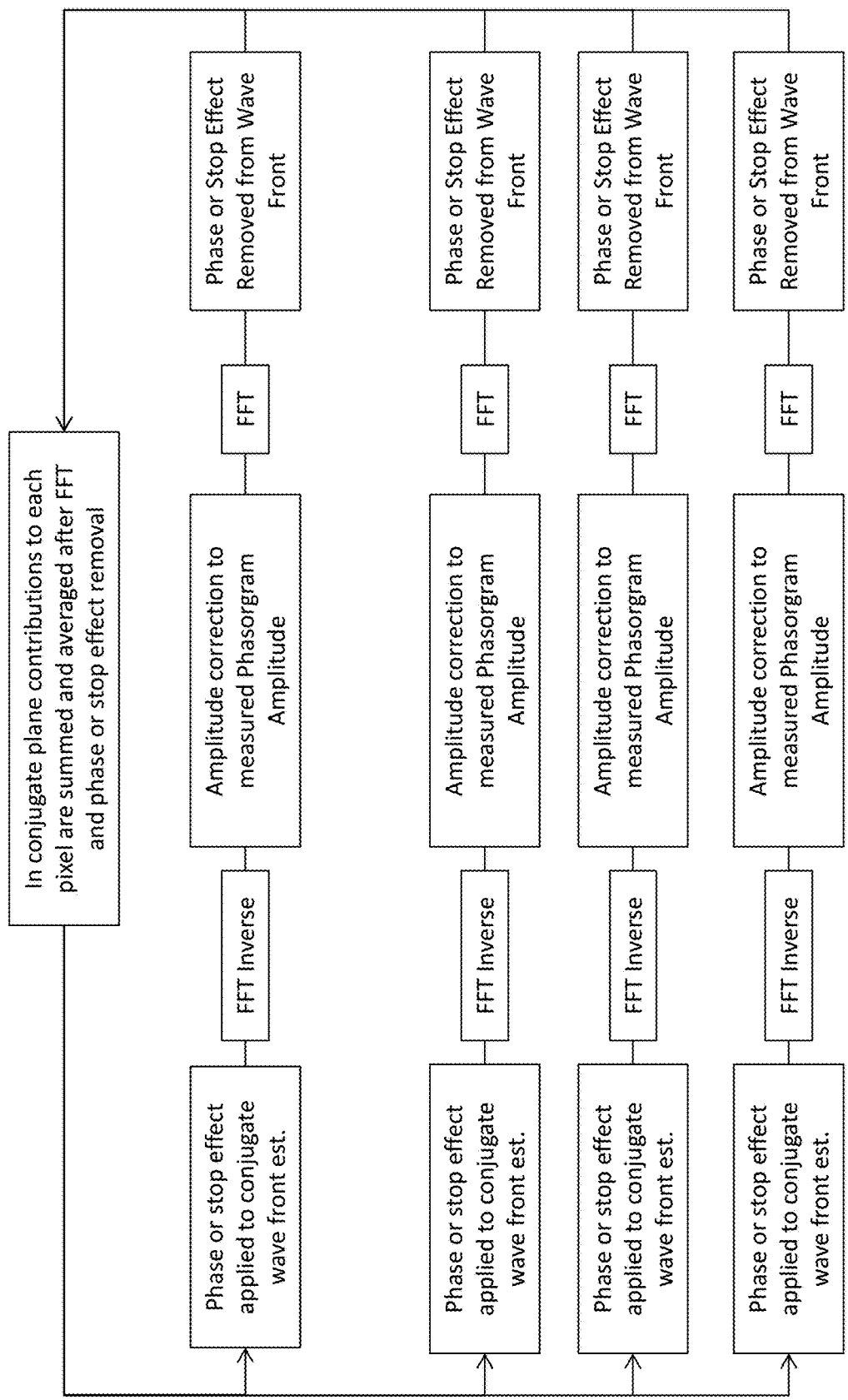
FIG. 7 is a prior art flow chart of the algorithm used at the processor of the optical system, in accordance with an embodiment.

FIG. 7 shows a flow chart of the algorithm used at the processor 220 (analogous to the processor 32 in FIG. 1). Its process can be followed by beginning with the N phasorgrams, which are amplitude distributions of complex wavefunctions. One seeks the unique phase distribution which is valid for each of them. To begin, assume that there is no reason to estimate one possible phase distribution over another. Set the phase distribution for all the phasorgrams to zero. Therefore, the first estimate is that they are all real functions. Now, Fourier transform each of them and retain the N complex transform functions. If the perturbing device associated with a particular phasorgram was a stop, then all the pixels on each transform that were stopped have their phasors set to zero amplitude. If the perturbing devices were optical lenses or kinoform lenses, then remove the phase effect of the perturber. That is, if the perturber advanced a pixel phasor by 1 rad, then retard that pixel phasor by 1 rad. Carry out the same removal procedure for all the pixels in all the transform functions.

Now, still referring to FIG. 7, on a per pixel basis, add together vectorially the phasors for the same pixel from each of the N transform complex functions (initial wave-front estimates) and average them. Phasors whose amplitude is zero because they were blocked are not considered in the average. Thus, if there were 10 transforms and for a particular pixel, in three of the transforms, that pixel was blocked, then the sum of the remaining seven phasors is divided by seven. This rule does not apply if the perturbers are lenses or kinoforms. There, zero-amplitude phasors are counted as values in the averaging. The resulting single averaged transform is the new estimate of the initial plane-wave front.

Next, apply to this wave estimate the effect of each different perturber in turn. Then, inverse Fourier transform each of the filtered initial wave estimates and retain them. Each of these new complex functions is an uncorrected estimate of the phasorgram of its respective filter or perturber. Correct this estimate by setting the amplitude of each pixel phasor in each of the new phasorgram estimates to the measured amplitude value while retaining the phase of the estimate. Now, the next iteration cycle begins with these new phasorgram estimates.

Note what has been done: there were N phasorgrams and complete knowledge of the N perturbers which created them. No information was in hand about perhaps the limited support of the initial wavefunction or about whether it was a complex function or not and so on. Instead, this algorithm in FIG. 7 relied on the principle of error energy reduction exclusively. As for error energy and how it is used, the algorithm begins by estimating the complex function in the plane of observation for each of the N phasorgrams. The phasor for each pixel in all N phasorgrams will have its amplitude set to the measured amplitude and for convenience the phase of each phasor in set to zero. Each of the N phasorgrams is Fourier transformed and the effects of their corresponding perturbers are removed. This yields N different estimates of the complex initial wave. These N estimates must now be combined to yield a single initial wave estimate according to some principle: the error reduction principle. Each initial wave pixel estimate has N or fewer phasor estimates and each of these will be changed to the same phasor estimate for that pixel. That change will require the vector addition to each of these phasor estimates of a different vector to change it to the single final phasor estimate for that pixel.

The final phasor estimate should be selected in such a way that the sum of the square of the norm of each of the distinct vectors, which are added to each of the N or fewer phasor estimates to yield the final single phasor estimate for the pixel, is a minimum. The sum of this number taken over all the pixels in each of the N initial wave estimates will be called the correction energy. One wants the correction energy to be as small as possible.

To achieve minimum correction energy achieved, consider a single pixel with its say L phasor estimates. Let E be the total correction energy contribution of this pixel. Then one has the following equation:

$$E = \sum_{i=1 \text{ to } L} (U_i - U_0)^2 + (V_i - V_0)^2, \tag{2}$$

where $(U_i, V_i)$ is the ith phasor estimate's real and imaginary coordinates and $(U_o, V_o)$ is the final phasor estimate's real and imaginary coordinates. Expanding yields $$E = \sum_{i=1 \text{ to } L} U_i^2 - 2U_i U_0 + U_0^2 + V_i^2 - 2V_i V_0 + V_0^2. \tag{3}$$

U and V are independent variables; so solving for each separately yields $$\frac{dE}{dU_0} = \sum_{i=1 \text{ to } L} -2U_i + 2U_0 = 0 \text{ or} \tag{4}$$

$$\frac{1}{L} \sum_{i=1 \text{ to } L} U_i = U_0; \tag{5}$$

similarly $$\frac{1}{L} \sum_{i=1 \text{ to } L} V_i = V_0. \tag{6}$$

That is, averaging the phasor estimates provides the final phasor estimate that was sought. This procedure only guarantees an extreme but the physical situation is such that there can be no maximum.

Now, in turn each of the perturbers are applied to this estimate and inverse Fourier transformed to yield N new estimates of the N phasorgrams in the observation plane. The perturbers (either optical lenses or kinoform lenses or holed stops) have been chosen to maintain the energy (norm squared) of both the initial uncorrected waveform estimates and the correction functions that were added to them. The linearity of the Fourier transform ensures that the new estimates of the complex phasorgrams will be composed of two parts; the previous iteration estimate plus the transform of the respective correction functions. Furthermore, Parseval's theorem insures that the energy of each of these two parts of a phasorgram estimate will have the same energy as it did in the initial plane. Simply put, Parseval's theorem states that the energies (the integrated squared norm of a complex function) of a function in both of the two conjugate Fourier planes will be the same. One now chooses to make the correction to each pixel phasor in the observation plane which is the smallest possible.

The total error energy over all phasorgrams as the process proceeds through the Fourier transforms and the removal of the perturber effects to the N new estimates of the initial wave front is the upper limit of the total correction energy. That is because the new estimate of the initial wave is the same as the previous estimate of the initial wave plus the transform of the error function that was added in the observation plane. Parseval's theorem ensures that that error function energy is the same in both conjugate planes. Thus, at this point, the algorithm could return to the previous initial wave estimate, causing the correction function energy to equal the error energy and the algorithmic process would stagnate. Neither the correction energy nor the error energy would change. However, by averaging the phasor estimates, one is guaranteed to have the lowest total correction energy possible. In this way, the algorithm proceeds from one conjugate plane to the other reducing the correction energy in the initial plane and then reducing the error energy in the observation plane. The goal, of course, is to find a phase distribution which makes the error energy or the correction energy zero or as close to zero as possible.

The new iterative algorithm described below is used to solve the phase retrieval problem (and used by the processors 220, 32 described herein to process the single image 30 (from the phasorgrams 28)). The defined error energy of the algorithm must decrease with each iteration or at worst remain the same. For the algorithm to work with the embodiment of the optical system 10 shown in FIG. 1 (and in FIGS. 5-6), the light source (e.g., laser 12) is immediately upstream or downstream of the environment 19 and the wave front phase will be changed by a phase filter (e.g., first and second diffractive optical elements 14, 24) so that the wave front at an object 20 in the environment 19 will be the sum of the unknown object 20 amplitude and phase distribution and the known phase filter distribution. The filter phase distribution is known. The filter amplitude distribution is equal to a constant of one. The output wave (at the specimen) will propagate along the Z axis to the diffraction plane located at $Z=Z_d$. There, the intensity or rather the amplitude distribution of the wave front will be measured for each different phase filter successively. The number of diffraction patterns in hand will equal the number (say, N) of phase filters used. The diffraction patterns will be known.

Computer processing all these wave data is done in an iterative manner. Successive cycles of the algorithm produce better and better estimates of the object 20 amplitude and phase distributions. There is the possibility that successive estimates do not change. In this case, additional filters (e.g., first and second diffractive optical elements 14, 24) will be required to generate additional diffraction patterns. However, the algorithm is guaranteed not to diverge from the correct estimate in a mean squared error sense.

The wave function in the diffraction plane is the Fourier transform of the filtered wave function in the object 20 plane. For no particular reason, begin the first iterative algorithm cycle in the diffraction plane corresponding to one particular filter. With the amplitude distribution of the wave which was measured, combine it with the best approximation for the phase distribution to yield the first estimate of the complete wave function for that particular filter in the diffraction plane. Put this estimate through an inverse Fourier transform to yield an estimate of the filtered specimen wave. In the computer (e.g., processor 220, 32), use an inverse phase filter to cancel the effect of the actual filter. (If an element of the physical filter shifted the phase by say plus 37 degrees, the inverse filter would shift the phase of that element by minus 37 degrees). This yields the first raw estimate of the object 20 phase and amplitude distribution. Save this object 20 estimate. Generally, use two two-dimensional matrices each with X & Y indices which cover the output plane. One matrix contains the Real part of the complex numbers which define the specimen wave function at each point on the object 20 and the other part contains the Imaginary part. Now, do the same procedure with each diffraction plane amplitude distribution adding the Real and Imaginary parts of the wave forms generated into the 2 corresponding Real and Imaginary matrices. Now, divide each number in the 2 matrices by the number of diffraction patterns (N) which have been used. Also, since we know that the value of the true object 20 wave is zero, we can set all values of elements outside the object 20 to zero. At this point, we may be able to incorporate any data that we know about the true object 20 wave into the estimated wave function that is contained in the two matrices, always taking care to make the correction as small as possible if there is a range of correction that will satisfy the known a priori constraint. Clearly, at this point our two matrices hold the first estimate of the wave function in the output or object 20 plane. Note that we have taken some number (say N) of recorded diffraction patterns in the diffraction plane to generate just one estimate of the wave function in the output plane before we apply any phase or occluding filters to it. The next step in the algorithm is to generate estimates of the N diffraction patterns that this estimate of the specimen wave function will produce after it has been modified by a phase (or occluding) filter.

Take one of the phase filters (e.g., first or second diffractive optical elements 12, 24) and essentially apply it to the estimate of the object 20 wave function in the output plane. Then, propagate the wave to the diffraction plane. In the computer (e.g., processor 220, 32), this is done by mathematically Fourier transforming the filtered estimate of the object 20 wave function. The diffraction pattern amplitude distribution generated will not match that which was physically measured and corresponded to that filter. So, replace the diffraction wave amplitude distribution with the measured distribution leaving all points on the wave at which I have no a priori measured data untouched. As the algorithm proceeds, these points will assume the value that they must have. The points so developed may be said to be extrapolated or interpolated depending on their location in the diffracted wave. Note that I have not modified the phase distribution of the diffracted wave. Thus, the second estimate of the diffracted wave corresponding to the phase filter chosen is in hand and this diffracted wave function is saved. Do the same procedure for the next N−1 remaining filtered output waves yielding a total of N diffracted wave second estimates. These are the new N diffracted wave estimates with which to begin the next cycle of the iterating algorithm.

A figure of merit is the sum of the squares of the differences between the diffraction amplitude distributions measured minus those estimated. This is the error energy for any particular cycle. It will be found that this error energy cannot increase and that given sufficient numbers of filtering data, will always decrease approaching a limit of zero. Of course, zero error will mean that not only has the phase inverse problem been solved but so too has the extrapolation and interpolation problems been solved in cases where this was required.

The method just described lends itself to implementation in a number of physical embodiments, which in turn suggest some possibly useful variations of the method. The above-described method may be applied to the operation of optical system 10 in FIGS. 1, 5 and 6, thereby achieving super-resolution. In order to do this, the reflected beams 22 generate the N diffraction patterns at detector 26 required as inputs to the algorithm. The algorithm is run as described above, generating not only the phase distribution at the diffraction plane, but also the amplitude and phase distribution at points not measured by detector 26, for example at points beyond the physical extent of detector 26 (extrapolation), and/or at omitted or doubtful points in between those measured by detector 26 (interpolation). By using the diffractive optical elements 12, 24 (in FIGS. 1, 5 and 6) in conjunction with the algorithm, diffraction patterns can be inverse-Fourier-transformed in parallel and a considerable speed-up in the operation of the algorithm can be achieved.

At step 140 of the method, a system, such as the guidance module 230 (FIG. 4) or the control computer 36 (FIG. 1) utilizes the representation 34 (i.e., processed single image 30) of the environment 19. Any system can utilize the output for any goal of the particular system. For example, according to one embodiment, the output of processing or analysis by the processor 220 is utilized by the automated vision and detection system 200 to achieve one or more goals of the system. In the example of an automated or semi-automated vehicle, the vehicular system may utilize the output to provide information or feedback to a driver. The vehicular system may utilize the information to navigate and control the vehicle. As the imager 210 entirely or almost entirely eliminates time distortion effects on the representation 34 of the environment 19, the vehicle (e.g., via the guidance module 230) has additional time to respond to objects 20 in the environment 19. For example, if a first vehicle is traveling in a first direction at 70 mph and a second vehicle is traveling in an opposing second direction at 70 mph toward to the first vehicle, there is approximately 3 seconds from detection of the other vehicle to contact. Most of the 3 seconds is needed for the mechanical response of the vehicle. Thus, by improving the detection (i.e., image processing) time, the vehicle has additional time to mechanically respond. This allows for improve object detection accuracy and an increased safety factor for the vehicle with the above-described automated vision and detection system 200.

The automated vision and detection system 200 can be a component of or integrated into any system or device requiring automated vision or detection. The automated vision and detection system 200 can be a component of or otherwise integrated into a guidance system, inspection system, processing system, sensor system, and/or many other systems. In another example, the automated vision and detection system 200 can be a component of or otherwise integrated into a handheld device configured to obtain imaging information from or about the environment. Many other types of vision or detection systems are possible.

In an example of an assembly line or other factory or similar setting, the automated vision and detection system 200 may utilize the output to provide information or feedback to a robot or other automated component which is configured to move or direct movement within the environment and therefore must have a representation of the environment, including but not limited to a real-time or near real-time representation.

In an alternative embodiment, the optical system 10 is used in a controlled environment, a room in a house (e.g., no rain, fog, or other weather), and within close range (e.g., ≤20 ft). In one such embodiment, the optical system 10 is integrated with gaming technology. For example, the optical system 10 in FIG. 1 can be integrated or otherwise installed with a gaming device, such as a gaming console or a gaming mobile device.

Traditional gaming technology relies on the projection of a line/grid pattern directed at an environment. The lines/grid are distorted when deflected off an object in the environment and using known fringe projection technique, information (data) is directed from the distorted lines/grid collected at a detector. The information is used to create an image, which is processed with signal processing. The signals are then used by programmable instructions or rules to control the game. In another example, mobile devices, such as cellular phones or smartphones, project an array of dots and detect/process the distortion of the array received at a detector.

However, in both examples, the traditional gaming systems and mobile devices are limited by the information provided by the line/grid pattern and the array of dots, respectively. The optical systems used in traditional gaming systems can only receive and process information from the line/grid or patterns and dot arrays. Thus, any information about the environment between the lines or dots is not retrieved or processed. Therefore, the line/grid pattern and dot arrays provide much less information than information regarding the entire wave, which is provided by the optical system 10 in FIG. 1, as described below.

Applying the optical system 10 to a gaming console or gaming mobile device would allow for a significant increase in resolution of the images (wave data) obtained by the gaming system due to the increased amount of wave data (or information) retrieved from the environment 19. Specifically, the optical system 10 will allow the gaming system to obtain a holographic capture ("digital holograph") of a whole scene in the environment.

Figure 6:
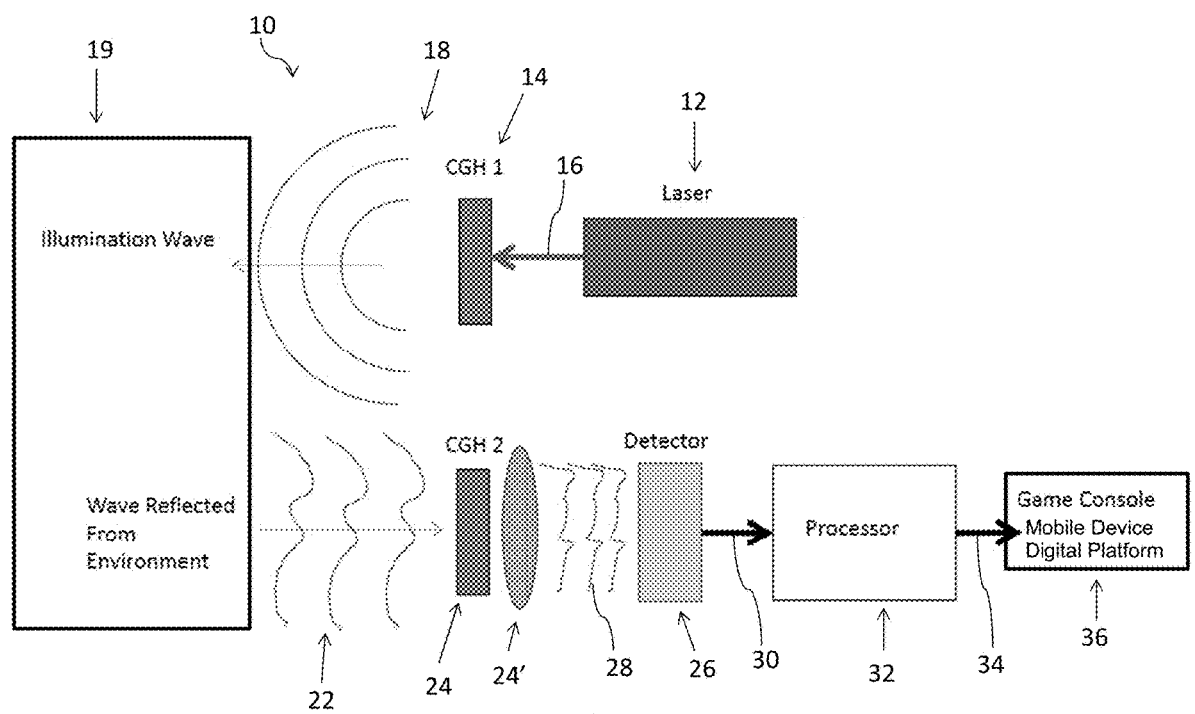
FIG. 6 is a diagrammatic representation of an optical system for a controlled environment at close range, in accordance with an alternative embodiment.

In order to obtain a digital holograph of an entire scene in an environment 19, the illumination of the optical system 10 must be controlled. An exemplary embodiment of the optical system 10 for a gaming device 36 is shown in FIG. 6. Note that the optical system 10 in FIG. 6 can be similarly applied to smartphones, cell phones, and other standalone devices with an illumination source 12 and a wireless connection to a processor 32. The illumination source 12 can be any light source that emits spatial and temporally coherent light at each laser. For example, a single laser can be used or VCSEL array can be used where each laser in the array emits spatial and temporally coherent light. As shown in FIG. 6, a continuous wavefront 18 ("illumination wave") is emitted from the laser 12 through the first diffractive optical element 12, rather than a discrete number of beams (as shown in FIG. 1). (In an alternative embodiment, the laser 12 can be replaced with a VCSEL array 12, such as that shown in FIG. 5. In yet another embodiment, the laser 12 and the first diffractive optical element 14 can be replaced with a VCSEL array 12, such as that shown in FIG. 5.)

This "illumination pattern" (i.e., continuous wavefront 18) blankets the area of interest or scene in the environment without gaps, unlike a line/grid pattern or spot array. The laser (or other illumination source) 12 must provide enough illumination to blanket (i.e., cover) the entire scene in the environment 19 to be captured. Thus, instead of only receiving information from reflected beams 22 from only where the lines (in the line/grid pattern) or dots (in the dot array) are projected, the blanket or cover of illumination receives reflected beams 22 from the entire scene.

The wave data 28 (e.g., phasorgrams) from the reflected beams 22 is received at a detector 26 and an image (digital holograph) 30 is produced. The reflected beams (or return light) 22 reflected from objects 20 in the environment 19 are split in a similar way as shown in FIGS. 1 and 5, but the processing varies slightly because the algorithm will attempt to judge distance across the entire field (environment 19), rather than just at the laser spots in an array or lines in a grid pattern.

The digital holograph 30 can be transmitted from the detector 26 to a processor 32 in a gaming console or mobile device 36 for formation of a representation 34 of the entire scene in the environment 19. The digital holograph 30 can also be directly transmitted to a display (not shown) in the gaming console or mobile device 36.

In one example wherein the digital holograph 30 is transmitted to a display (not shown), participants viewing the display can interact with the digital holograph 30. In addition, with this data, they could interact in mixed reality. This could include uploading (via the Internet) the digital holograph 30 to a social media platform, such as Instagram or YouTube, a mobile device application, such as FaceTime, or another web application, such as one for telemedicine, a digital teaching platform, a digital sales platform (e.g., Amazon or Shopify), digital gaming platforms, digital advertising platforms, or any other digital platform. This very significant difference is a creation of mixed reality that allows participants (or users) to interact with each other and the virtual environment in a real-time in a three-dimensional high-resolution manner, which is via a true interactive digital holograph 30, or in a mixed reality environment. Such differences in the gaming system described above would allow the gaming system to more accurately process the environment and objects in the environment, thereby increasing the accuracy of the game.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. An optical system for generating digital images, comprising:
    a single light source configured to emit a beam into an environment;
    a first diffractive optical element in alignment with the light source such that the beam passes through the first diffractive optical element, resulting in an illumination wave emitted with a plurality of beams into the environment;
    a second diffractive optical element configured to receive a reflected illumination wave;
    wherein the reflected illumination wave is the illumination wave reflected back from the environment;
    a two-dimensional pixelated detector in alignment with the second diffractive optical element such that the detector receives the reflected illumination wave passed through the second diffractive optical element;
    wherein the two-dimensional pixelated detector is configured to determine wave data from the reflected illumination wave and generate an image having a plurality of pixels representing the wave data; and
    a processor configured to receive the image having the plurality of pixels representing the wave data and generate a representation of the environment from the image having the plurality of pixels.

2. The system of claim 1, further comprising a control computer configured to receive the representation of the environment from the processor, wherein the control computer is a computer in at least one of a smartphone, mobile device, and gaming console.

3. The system of claim 1, wherein the light source emits spatial and temporally coherent light.

4. The system of claim 1, wherein the processor is configured to transmit the representation of the environment to a web application.

5. The system of claim 1, wherein the processor is connected to a smart phone.

* * * * *